(12) United States Patent
Yamamoto

(10) Patent No.: US 7,953,248 B2
(45) Date of Patent: May 31, 2011

(54) TRUE/FALSE DETERMINING APPARATUS, IMAGE FORMING APPARATUS, TRUE/FALSE DETERMINING METHOD, AND IMAGE FORMING METHOD

(75) Inventor: Satoru Yamamoto, Abiko (JP)

(73) Assignee: Canon Kabushiki Kaisha (JP)

( * ) Notice: Subject to any disclaimer, the term of this patent is extended or adjusted under 35 U.S.C. 154(b) by 1063 days.

(21) Appl. No.: 11/734,844

(22) Filed: Apr. 13, 2007

(65) Prior Publication Data

US 2007/0242857 A1    Oct. 18, 2007

(30) Foreign Application Priority Data

Apr. 13, 2006    (JP) .................. 2006-111048

(51) Int. Cl.
*G06K 9/00*    (2006.01)
(52) U.S. Cl. ....................................... 382/108
(58) Field of Classification Search .................. 382/100, 382/108; 345/582–588
See application file for complete search history.

(56) References Cited

U.S. PATENT DOCUMENTS

2002/0140995 A1* 10/2002 Cardot et al. ................. 358/498
2005/0151990 A1* 7/2005 Ishikawa et al. ............. 358/1.14

FOREIGN PATENT DOCUMENTS

JP    2005-3839 A    1/2005

OTHER PUBLICATIONS

Russell Cowburn, "'Fingerprinting' documents and packaging", Nature, vol. 436, p. 475.*

* cited by examiner

*Primary Examiner* — Samir A Ahmed
*Assistant Examiner* — Atiba O. Fitzpatrick
(74) *Attorney, Agent, or Firm* — Rossi, Kimms & McDowell LLP

(57) ABSTRACT

A true/false determining apparatus that can determine the genuineness of a material with high accuracy. Coherent light is radiated onto a surface of an object. Reflected light of the coherent light reflected by the object detecting unit is detected. A part to be used as a pattern sample from intensity distribution of the reflected light detected by the detecting unit is selected. Pattern data is generated from the intensity distribution of the reflected light in selected the part. The generated pattern data is matched against reference pattern data.

20 Claims, 7 Drawing Sheets

LIGHT INTENSITY

LOW-PASS LIGHT INTENSITY

BINARIZED (SELECTED) DATA

PATTERN SAMPLE

EDGE OF PAPER    IMAGE PART

SCATTERED
LIGHT INTENSITY

TRUE/FALSE DETERMINING APPARATUS, IMAGE FORMING APPARATUS, TRUE/FALSE DETERMINING METHOD, AND IMAGE FORMING METHOD

BACKGROUND OF THE INVENTION

1. Field of the Invention

The present invention relates to a true/false determining apparatus, an image forming apparatus, a true/false determining method, and an image forming method that ascertain the genuineness of a material, for example, whether or not a printed material such as paper is the original one. More particularly, the present invention relates to a true/false determining apparatus, an image forming apparatus, a true/false determining method, and an image forming method having a mechanism to recognize the intrinsic property of a surface of a material using coherent light.

2. Description of the Related Art

A material such as paper has roughness on its surface that is impossible to be modified controllably. There have been disclosed methods of ascertaining the genuineness of a material using the roughness.

For example, a method has been proposed by which weaving patterns of fiber in a predetermined area on the surface of paper are optically read and registered with a server as a reference image. Then, at true/false determination, the surface state of the above predetermined area or a wide range of area including the predetermined area on the object is optically read and the true/false determination is performed by carrying out pattern matching between the surface state and the registered reference image (for example, see Japanese Laid-Open Patent Publication (Kokai) No. 2005-03839).

In the above conventional true/false determining method, the true/false determination is performed by binarizing image data of the optically read surface and carrying out the pattern matching on the binarized image data. However, paper fiber is so fine that the S/N ratio could not be achieved that is high enough to be used for the determination even if the image data of an optically read surface is binarized. Furthermore, in the case of relatively smooth-surfaced paper such as coating paper or image-formed paper, it is difficult to recognize its surface pattern, therefore the recognition rate of its surface pattern is low.

In addition, one of the methods of detecting roughness of a surface of a material uses the speckle phenomenon. In a speckle phenomenon, when coherent light such as laser is radiated onto a surface of a material, a random-dot pattern emerges on an observed surface exposed to the reflected light. Coherent light is, for example, single-wavelength and single-phase light with high coherency.

A speckle pattern, which emerges as coherent light beams scattered due to roughness of a surface of a material interfere with each other on an observed surface, has a pattern specific to the surface of the material. It has an advantage of raising the S/N ratio relative to the case that the structure on a surface of a material is observed using incoherent light, instead of coherent light.

A method of identifying a material using a speckle pattern is, for example, disclosed in "'Fingerprinting' documents and packaging", Russel Cowburn, Nature, vol. 436. In this document, a method is proposed by which a speckle pattern on a surface of an original document is previously registered as reference image data, and then the true/false determination is performed by carrying out pattern matching between the reference image data and the speckle pattern of the surface of the object of the determination.

However, since the conventional true/false determining method according to "'Fingerprinting' documents and packaging", Russel Cowburn, Nature, vol. 436 uses, for example, a source of single-wavelength laser light, a speckle pattern cannot be achieved if there is an area to absorb said wavelength on paper. In this case, the true/false determination is impossible.

For example, in the case of the true/false determination using a speckle pattern and semiconductor laser with wavelength of 440 nm, if there is a carbon black marking area in the vicinity of an extreme edge of paper, a speckle pattern of scattered light intensity distribution is achieved as shown in FIG. 7. In an image part, scattered light (reflected light) is not achieved because laser light is absorbed there. Because of this, no speckle pattern is achieved corresponding to the image part. On relatively smooth-surfaced coating paper, for example, high-rising is recognized with respect to scattered light intensity distribution of a speckle pattern corresponding to an area on which no image is formed, as shown in FIG. 8.

In the above situation, if binarization is performed on a speckle pattern on a surface of a material detected by including an area with no speckle pattern, for example, binarized patterns representing an image area and an non-image area are detected, resulting no precise binarized pattern. That is, there is possibility that sufficient S/N ratio cannot be achieved by the conventional true/false determining method using a speckle pattern.

In addition, there is a possibility that the frequency of a speckle pattern is high to be used for authentication, so that it takes a long time to perform the pattern matching on a wide area to be authenticated.

SUMMARY OF THE INVENTION

The present invention provides a true/false determining apparatus, an image forming apparatus, a true/false determining method, and an image forming method that can determine the genuineness of a material with high accuracy.

In a first aspect of the present invention there is provided a true/false determining apparatus comprising: a radiating unit adapted to radiate coherent light onto a surface of an object; a detecting unit adapted to detect reflected light of the coherent light reflected by the object; a selection unit adapted to select a part to be used as a pattern sample from intensity distribution of the reflected light detected by the detecting unit; a pattern data generating unit adapted to generate pattern data from the intensity distribution of the reflected light in the part selected by the selection unit; and a matching unit adapted to match the pattern data generated by the pattern data generating unit against reference pattern data.

The selection unit can perform binarizing processing on the intensity distribution of the detected reflected light, and can select a part to be used as the pattern sample based on the intensity distribution of the reflected light on which the binarizing processing has been performed.

The selection unit can select a high-level part of the intensity distribution of the reflected light on which the binarizing processing has been performed as the part to be used as the pattern sample.

The true/false determining apparatus can further comprises a conveying unit adapted to convey the object at a regular rate.

In a second aspect of the present invention, there is provided a true/false determining apparatus comprising: a radiating unit adapted to radiate coherent light onto a surface of an object; a detecting unit adapted to detect reflected light of the coherent light reflected by the object; a selection unit adapted to select a part to be used as a pattern sample from intensity distribution of the reflected light detected by the detecting unit; a first pattern data generating unit adapted to generate first pattern data from the intensity distribution of the reflected light on the part selected by the selection unit; a first matching unit adapted to match the first pattern data generated by the first pattern data generating unit against first reference pattern data; a second pattern data generating unit adapted to generate second pattern data from intensity distribution of the reflected light on a part selected by the selection unit depending on a matching result in the first matching unit; and a second matching unit adapted to match the second pattern data generated by the second pattern data generating unit against second reference pattern data.

The selection unit can perform binarizing processing on the intensity distribution of the detected reflected light, and can select a part to be used as the pattern sample based on the intensity distribution of the reflected light on which the binarizing processing has been performed.

The selection unit can select a high-level part of the intensity distribution of the reflected light on which the binarizing processing has been performed as the part to be used as the pattern sample.

The second pattern data generating unit can generate the second pattern data if the first pattern data is determined to match the first reference pattern data, as a result of the matching in the first matching unit.

The true/false determining apparatus can further comprises a conveying unit adapted to convey the object at a regular rate.

In a third aspect of the present invention, there is provided an image forming apparatus comprising the above-mentioned true/false determining apparatus.

In a fourth aspect of the present invention, there is provided a true/false determining method comprising: a radiating step of radiating coherent light onto a surface of an object; a detecting step of detecting reflected light of the coherent light reflected by the object; a selection step of selecting a part to be used as a pattern sample from intensity distribution of the reflected light detected in the detecting step; a pattern data generating step of generating pattern data from the intensity distribution of the reflected light in the part selected in the selection step; and a matching step of matching the pattern data generated in the pattern data generating step against reference pattern data.

The selection step can include performing binarizing processing on the intensity distribution of the detected reflected light, and selecting a part to be used as the pattern sample based on the intensity distribution of the reflected light on which the binarizing processing has been performed.

The selection step can include selecting a high-level part of the intensity distribution of the reflected light on which the binarizing processing has been performed as the part to be used as the pattern sample.

The true/false determining method can further comprises a conveying step of conveying the object at a regular rate.

In a fifth aspect of the present invention, there is provided a true/false determining method comprising: a radiating step of radiating coherent light onto a surface of an object; a detecting step of detecting reflected light of the coherent light reflected by the object; a selection step of selecting a part to be used as a pattern sample from intensity distribution of the reflected light detected in the detecting step; a first pattern data generating step of generating pattern data from the intensity distribution of the reflected light in the part selected in the selection step; a first matching step of matching the first pattern data generated in the first pattern data generating step against first reference pattern data; a second pattern data generating step of generating second pattern data from intensity distribution of the reflected light on the part selected in the selection step depending on a matching result in the first matching step; and a second matching step of matching the second pattern data generated in the second pattern data generating step against second reference pattern data.

The selection step can include performing binarizing processing on the intensity distribution of the detected reflected light, and selecting a part to be used as the pattern sample based on the intensity distribution of the reflected light on which the binarizing processing has been performed.

The selection step can include selecting a high-level part of the intensity distribution of the reflected light on which the binarizing processing has been performed as the part to be used as the pattern sample.

The second pattern data generating step can include generating the second pattern data if the first pattern data is determined to match the first reference pattern data, as a result of the matching in the first matching step.

The true/false determining method can further comprises a conveying step of conveying the object at a regular rate.

In a sixth aspect of the present invention, there is provided an image forming method of executing the above-mentioned true/false determining method.

With this configuration, intensity distribution of light reflected from an object exposed to coherent light is detected, a part that can be used as a pattern sample for the matching against reference pattern data is selected from the intensity distribution of the detected reflected light. In this manner, the area can be selected where a speckle pattern is gained easily and a surface pattern on a material being an object of the determination can be read with high accuracy irrespective of the surface state. Therefore, the genuineness of the material can be determined with high accuracy.

Also, with this configuration, a part that can be used as a pattern sample for the matching against reference pattern data is selected from the intensity distribution of the reflected light that has been detected, and first pattern data is generated from the intensity distribution of the reflected light corresponding to the selected part. Then, the first pattern data is matched against first reference pattern data, and depending on a result of the matching, second pattern data corresponding to said selected part is generated. Then, the second pattern data is matched against second reference pattern data. That is, first, a position to read a speckle pattern is aligned by the matching between the first pattern data in the selected part and the first reference pattern, and then the true/false determination can be performed by matching between the speckle pattern at the reading position and the second reference pattern data. This can reduce time for the pattern matching. It can also ascertain the genuineness of a material with higher accuracy.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

DETAILED DESCRIPTION OF THE PREFERRED EMBODIMENTS

Preferred embodiments of the present invention will be described in detail below with reference to the drawings.

First, a true/false determining apparatus according to a first embodiment of the present invention will be described.

Figure 1:
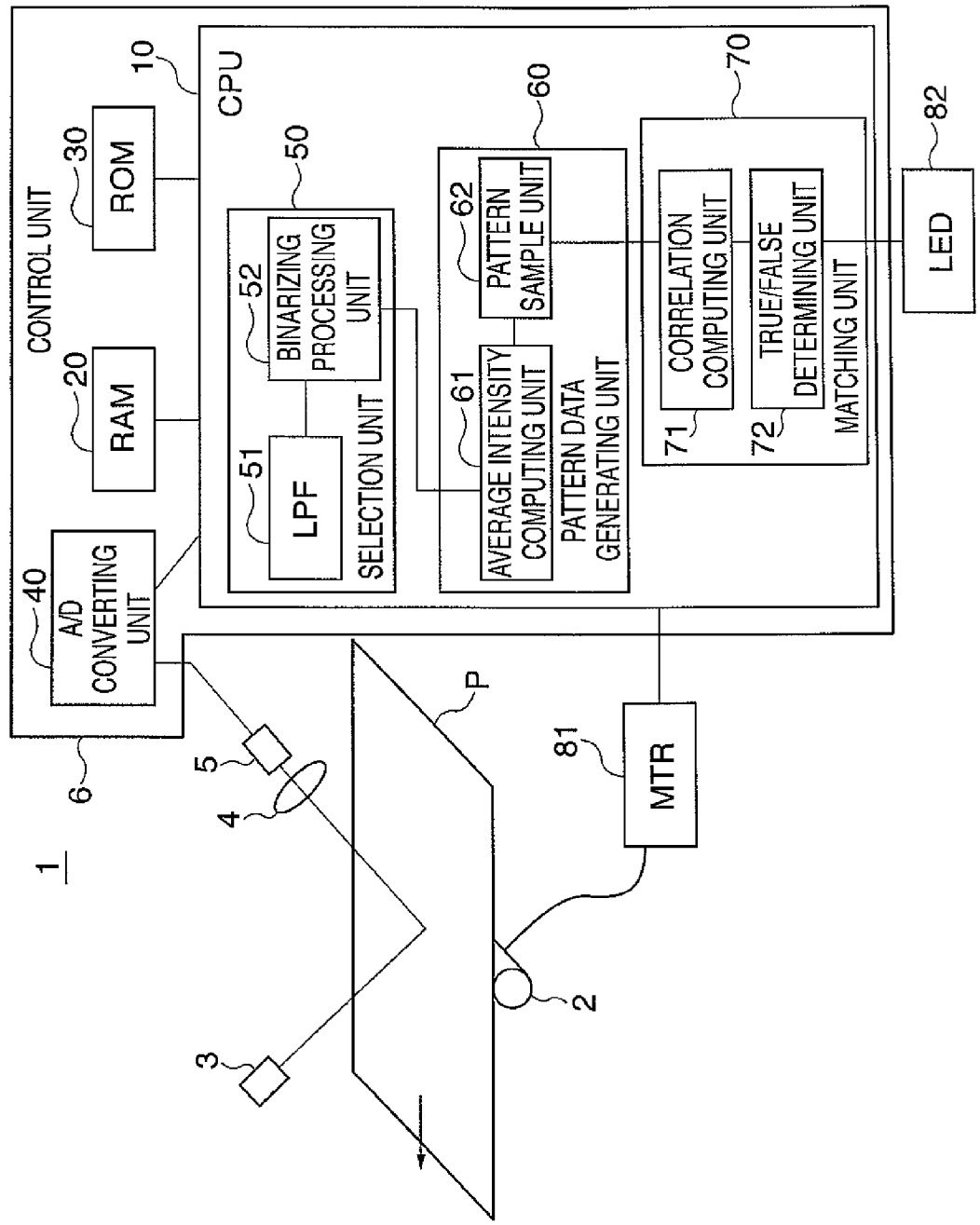
FIG. 1 is a view showing overall construction of a true/false determining apparatus according to a first embodiment of the present invention.

FIG. 1 is a view showing overall construction of a true/false determining apparatus 1 according to a first embodiment of the present invention.

As shown in FIG. 1, the true/false determining apparatus 1 comprises a roller 2 that conveys paper P being an object of true/false determination, a laser light source 3, an optical system 4, a photodiode 5, and a control unit 6.

The roller 2 conveys the paper P to the direction of the arrow in FIG. 1 at 100 mm/s, for example. The roller 2 is not limited to the one that conveys paper, but may be the one that conveys other materials being an object of the true/false determination.

The laser light source 3 is a coherent light source that radiates the paper P conveyed by the roller 2 with laser being coherent light. The laser emitted from the laser light source 3 radiates a predetermined range (a laser spot) on the paper P by a collimator lens (not shown) For example, the laser light source 3 forms a laser spot of a diameter 10 mm on the paper P.

The photodiode 5 detects a speckle pattern indicative of the surface state of the object radiated with laser. Specifically, laser beams from the laser light source 3 are scattered (reflected) on the surface of the paper P, and the scattered laser beams are formed into an image on the acceptance surface of the photodiode 5 by the optical system 4. The scattered laser beams interfere, as described above, each other to form a specific speckle pattern on the acceptance surface being the surface of the paper P. The photodiode 5 converts scattered light intensity distribution on the acceptance surface into electric signals to create speckle pattern data and outputs this data to the control unit 6.

The control unit 6 comprises a CPU 10, a RAM 20, a ROM 30 and an A/D converting unit 40, as shown in FIG. 1.

The CPU 10 executes a program stored in the ROM 30 to control all the components of the true/false determining apparatus 1. The RAM 20 temporarily holds various types of data, or is used as a working area for operation processing by the CPU 10.

The A/D converting unit 40 converts the speckle pattern data detected by the photodiode 5 into digital data with the A/D conversion and outputs the digital data to the CPU 10. The A/D converting unit 40 converts, for example, the analog data (speckle pattern data) detected by the photodiode 5 into 8-bit digital data and outputs the digital data to the CPU 10.

The CPU 10 reads out the speckle pattern data converted into the 8-bit digital data in the A/D converting unit 40, and stores the speckle pattern data in the RAM 20 for a predetermined time, for example 500 ms.

Furthermore, the CPU 10 comprises a selection unit 50, a pattern data generating unit 60, and a matching unit 70, as shown in FIG. 1.

The selection unit 50 comprises a low-pass filter (hereinafter simply referred to as "the LPF") 51 that filters out signals higher than a predetermined frequency, and a binarizing processing unit 52 that performs binarizing processing. The selection unit 50 selects a speckle pattern appropriate to the usage for the matching against an original document from speckle patterns of the paper P detected by the photodiode 5, as described below.

The pattern data generating unit 60 comprises an average intensity computing unit 61 and a pattern sample unit 62. The average intensity computing unit 61 computes the average intensity of the speckle pattern selected by the selection unit 50. The pattern sample unit 62 uses the computed average intensity to generate pattern data to be used for the matching against the original document.

The matching unit 70 comprises a correlation computing unit 71 and a true/false determining unit 72. The correlation computing unit 71 performs cross-correlation computing on the pattern data generated by the pattern data generating unit 60 and the reference pattern data, and calculates a correlation level between the generated pattern data and the reference pattern data. The true/false determining unit 72 performs the true/false determination based on the correlation level calculated by the correlation computing unit 71 to determine whether or not the paper P is genuine.

The above reference pattern data is, as described below, data indicative of a speckle pattern of a predetermined part of an original document (a genuine one) being an object of the true/false determination, for example, the speckle pattern of the predetermined part of the original document detected previously by the true/false determining apparatus 1. The reference pattern data is stored in the ROM 30.

The true/false determining apparatus 1 further comprises a driving motor 81 that drives the roller 2 and an LED 82, as shown in FIG. 1. The driving motor 81 and the LED 82 are both connected to and controlled by the CPU 10.

In the true/false determining apparatus 1 with the above construction, the CPU 10 operates based on a program stored in the ROM 30 to control the laser light source 3, the photodiode 5, the driving motor 81 and the LED 82 for execution of the true/false determination processing.

Figure 2:
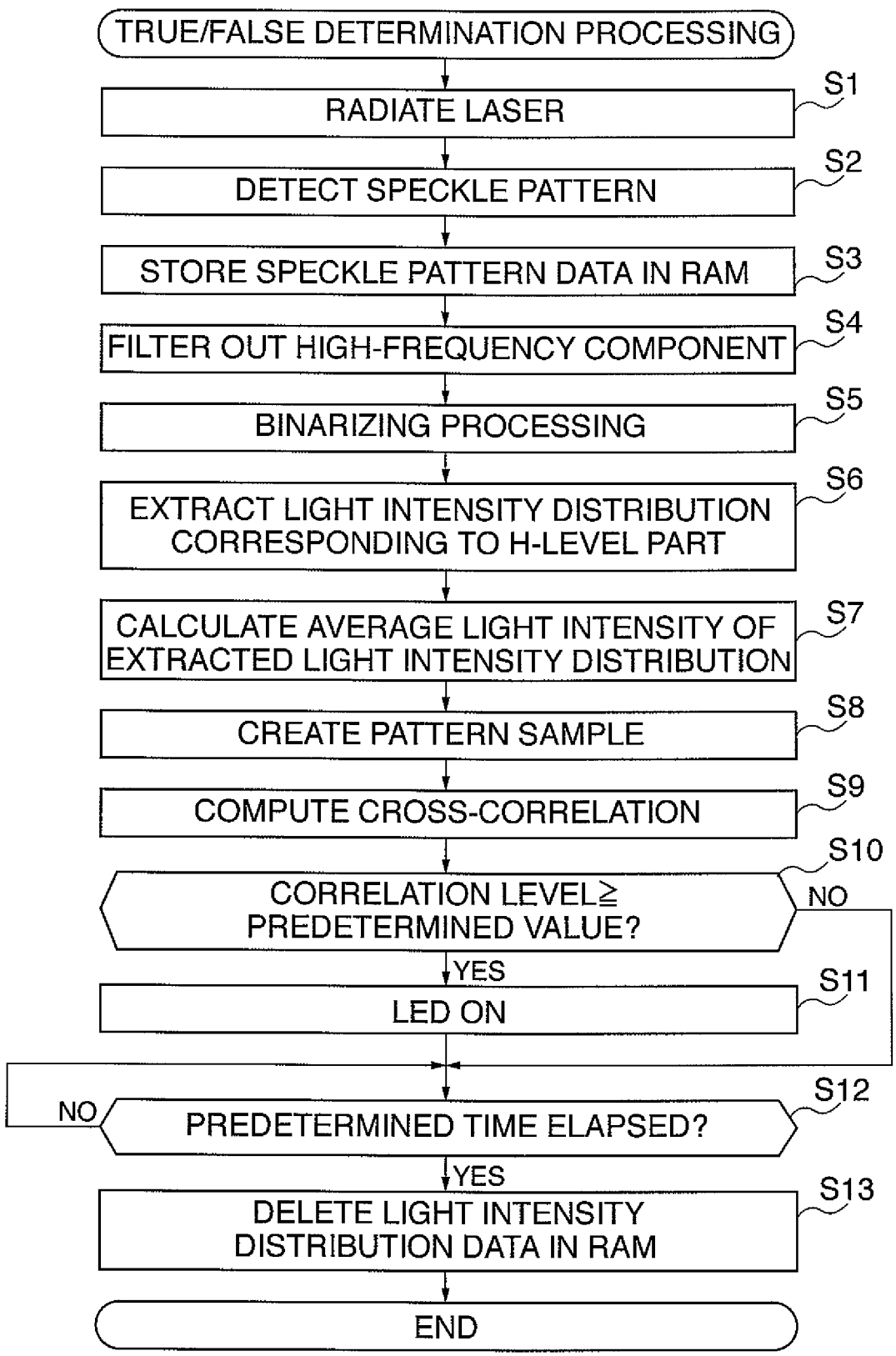
FIG. 2 is a flowchart showing the procedure of true/false determination processing executed by the true/false determining apparatus in FIG. 1.

Next, a true/false determining method executed by the true/false determining apparatus 1 will be described with reference to FIG. 2 and FIGS. 3A to 3E. FIG. 2 is a flowchart showing the procedure of true/false determination processing executed by the true/false determining apparatus 1 in FIG. 1, and FIGS. 3A to 3E are views showing data generated in the true/false determination processing.

The true/false determination processing starts when a user directs the start-up of true/false determination through an operation unit (not shown) comprised in the true/false determining apparatus 1. This processing starts up the laser light source 3 first, and then the driving motor 81 to drive the roller 2. In this manner, laser is emitted and the paper P being the object of the determination is conveyed such that the laser is radiated onto a surface of the paper P (step S1).

Next, a speckle pattern on the surface of the paper P is detected at a laser spot by the photodiode 5 (step S2), and the A/D converting unit 40 converts the pattern with the A/D conversion to generate digital speckle pattern data, which is in turn stored in the RAM 20 (step S3).

Figure 3A:
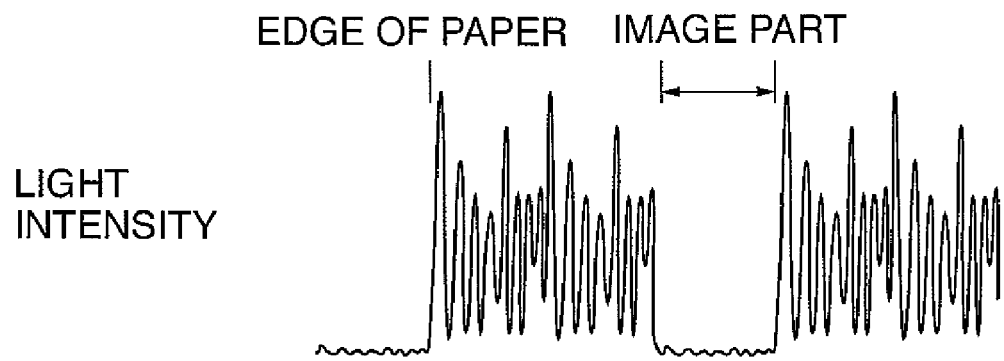
FIGS. 3A to 3E are views showing data generated in the true/false determination processing in FIG. 2.

In step S2, for example, the speckle pattern with the light intensity distribution as in FIG. 3A is detected. FIG. 3A illustrates the light intensity of scattered light, which is detected by the photodiode 5, from the paper P conveyed to the direction of the arrow in FIG. 1 by the motor 81 and the roller 2. FIG. 3A also illustrates the case that the paper P is detected on which an image is formed in the vicinity of an extreme edge in the feed direction.

Figure 3B:

Next, the selection unit 50 extracts an appropriate part as data to be used for the true/false determination from the light intensity distribution data (FIG. 3A) stored in the RAM 20. Specifically, first, the light intensity distribution data stored in the RAM 20 is passed through the LPF 51, and frequency components higher than a predetermined cutoff frequency are filtered out (step S4). As a result of step S4, the light intensity distribution data as in FIG. 3B is generated.

Figure 3C:
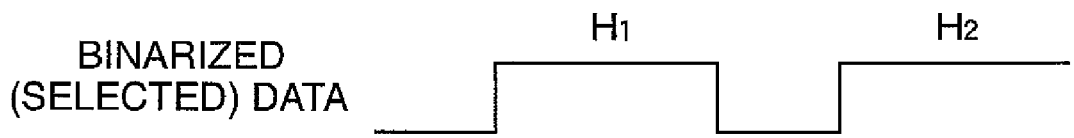

Then, the binarizing processing unit 52 binarizes the light intensity distribution data generated in step S4 (step S5). In step S5, binarized data (selected data) is generated by which a non-image part on which no image is formed and an image part on which an image is formed are labeled as an H-level and an L-level, respectively, as shown in FIG. 3C.

The cutoff frequency used in the LPF 51 is set to a value such that the appropriate part as data used for the true/false determination can be extracted, for example, a value such that the image part and the non-image part can be distinguished from each other in the above binarizing processing. In addition, a threshold used for the binarizing processing by the binarizing processing unit 52 is set to a value such that the image part and the non-image part can be calculated.

Then, the pattern data generating unit 60 generates pattern data based on the selected data (FIG. 3C) generated by the selection unit 50.

Figure 3D:
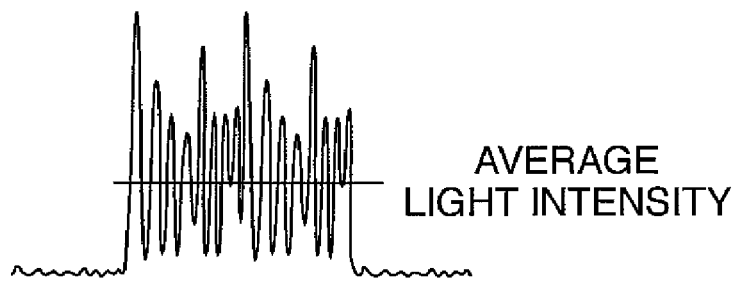
Figure 3E:

Specifically, first, the average intensity computing unit 61 extracts light intensity distribution corresponding to the H-level part, for example an H1 part of the selected data (FIG. 3C) from the light intensity distribution data (FIG. 3A) stored in the RAM 20 (step S6). Then, average light intensity of the extracted light intensity distribution is computed (step S7). In step S6, light intensity distribution data corresponding to the H1 part of the binarized data (FIG. 3C) is extracted from the light intensity distribution data (FIG. 3A) detected in step S2, as shown in FIG. 3D, and in step S7, average light intensity of the extracted light intensity distribution is calculated. Then, the pattern sample unit 62 sets a threshold for a pattern sample to the average light intensity calculated in step S7 and filters out frequency components of levels above the threshold from the light intensity distribution extracted in step S6 to generate a pattern sample (step S8). In step S8, the pattern sample as in FIG. 3E is generated. Although the threshold in step S8 is the average light intensity calculated in step S7 to generate the pattern sample, the threshold is not limited to the average light intensity.

Next, the matching unit 70 performs the true/false determination on the paper P. Specifically, first, the correlation computing unit 71 performs cross-correlation computing processing on a reference pattern for the true/false determination prestored in the RAM 20 and the pattern sample generated in step S8 to calculate a cross-correlation level between them (step S9). Next, the true/false determining unit 72 determines whether the calculated cross-correlation level is not less than a predetermined value (step S10). If the calculated cross-correlation level is not less than the predetermined value, the pattern sample generated in step S8 matches the reference pattern, i.e., the paper P is determined to be the original document, therefore to be genuine. Accordingly, the LED 82 is turned on (step S11) and the processing proceeds to step S12. In step S1, the turning on of the LED 82 notifies a user that the paper P is the original document. Otherwise, if the calculated cross-correlation level is less than the predetermined value, the paper P is determined not to be genuine. Accordingly, the processing proceeds directly to step S12 without the LED 82 being turned on. The predetermined value in step S10 is previously set to a value such that the generated pattern sample can be determined to match the reference pattern. Steps S9 and S10 may be arranged such that, for example, correlation between the patterns is analyzed with respect to 100 pixels from each pattern, and the patterns are determined to be same if 70 or more of the pixels match.

In step S12, a timer (not shown) comprised in the control unit 6 determines whether or not a predetermined time, 500 ms in this embodiment, has elapsed since the start-up time of this processing. If the predetermined time has been elapsed, the light intensity distribution data (FIG. 3A) stored in the RAM 20 is erased, the LED 82 is turned off (step S13), and this processing ends.

This processing can be executed iteratively until a user directs to finish the true/false determination processing or conveyance of the paper P ends, or can be finished by ejecting the paper P at the time when the paper P is determined to be genuine.

In the above processing, the reference pattern is the pattern sample of the predetermined area of the original document created by executing the processing in the above steps S1 to S8. The pattern sample is prestored in the RAM 20 as the reference pattern.

As described above, the true/false determining apparatus 1 according to the first embodiment of the present invention detects a speckle pattern of an object (the paper P) of the true/false determination, filters out frequency components higher than the predetermined cutoff frequency from the detected speckle pattern, and performs the binarizing processing. In this way, the image part and the non-image part can be detected correctly from the detected speckle pattern. Then, light intensity distribution of a speckle pattern corresponding to the non-image part is extracted to calculate average light intensity, and a pattern sample is generated using the average light intensity as a threshold. Then, the generated pattern sample is matched against the reference pattern to determine whether or not the object is genuine. In this manner, the speckle pattern of the non-image part is selected from which the speckle pattern representing the surface state of the object with high accuracy can be gained, and the pattern sample is generated for the matching based on the selected speckle pattern. Therefore, the true/false determination can be performed based on the pattern sample representing the surface pattern with high accuracy irrespective of the state of the object surface, and also accurate true/false determination can be performed on the object.

Next, a true/false determining apparatus according to a second embodiment of the present invention will be described.

The true/false determining apparatus according to this embodiment has different construction of a control unit relative to the true/false determining apparatus 1 according to the above first embodiment, and executes a different true/false determining method. Hereinafter, like reference characters designate like elements corresponding to the true/false determining apparatus 1 according to the above first embodiment, and the description thereof will be omitted and only different elements will be described.

Figure 4:
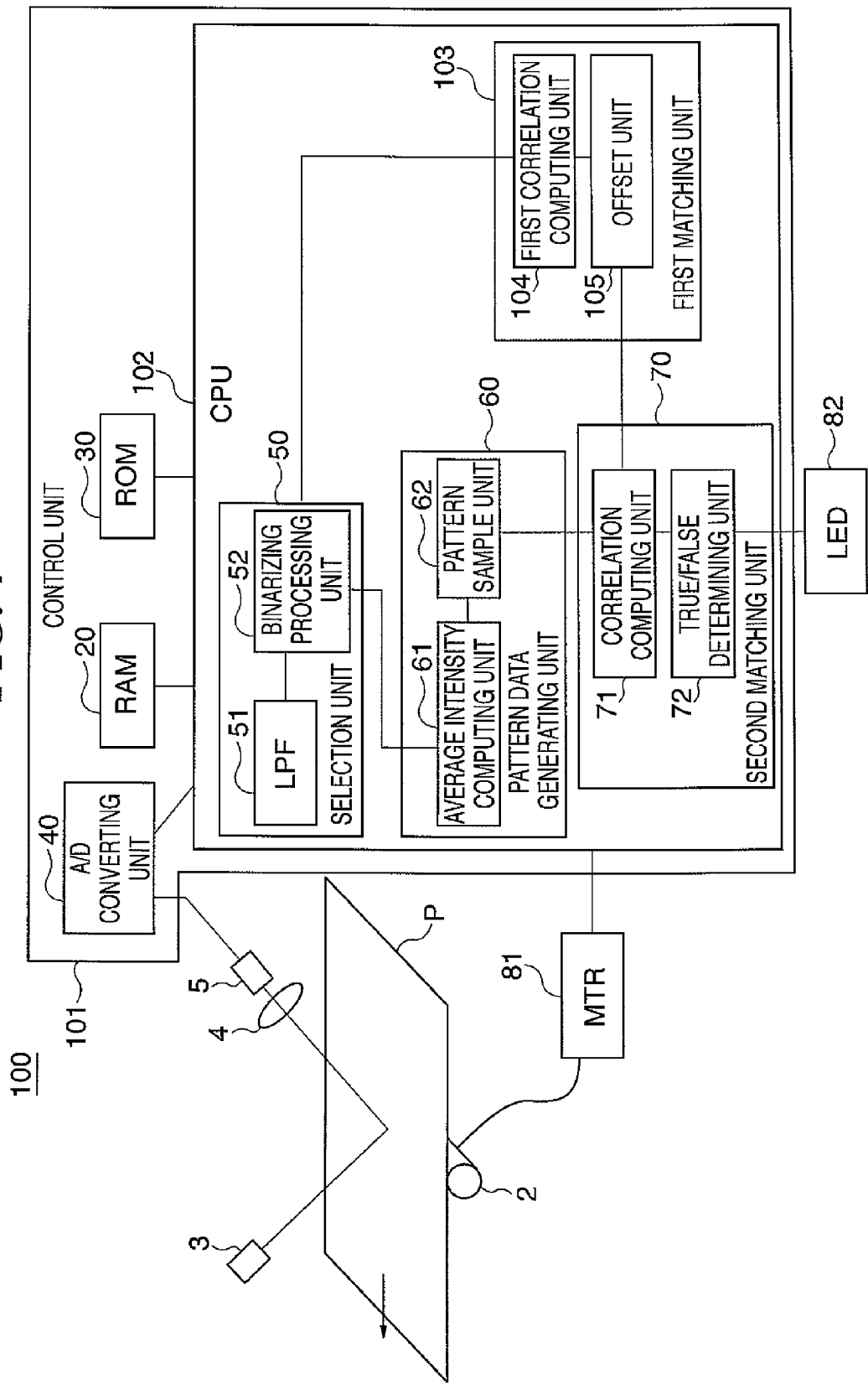
FIG. 4 is a view showing overall construction of a true/false determining apparatus according to a second embodiment of the present invention.

FIG. 4 is a view showing overall construction of a true/false determining apparatus 100 according to the second embodiment of the present invention.

As shown in FIG. 4, the true/false determining apparatus 100 comprises a control unit 101 instead of the control unit 6 of the true/false determining apparatus 1 in FIG. 1. The control unit 101 has different structure of CPU relative to the control unit 6 in FIG. 1. The control unit 101 comprises a CPU 102 that comprises a first matching unit 103 in addition to the components of the CPU 10 of the control unit 6 in FIG. 1. The first matching unit 103 comprises a first correlation computing unit 104 and an offset unit 105. In this embodiment, the matching unit 70 in FIG. 1 is called a second matching unit 70 and the correlation computing unit 71 is called a second correlation computing unit 71, for convenience.

Figure 5:
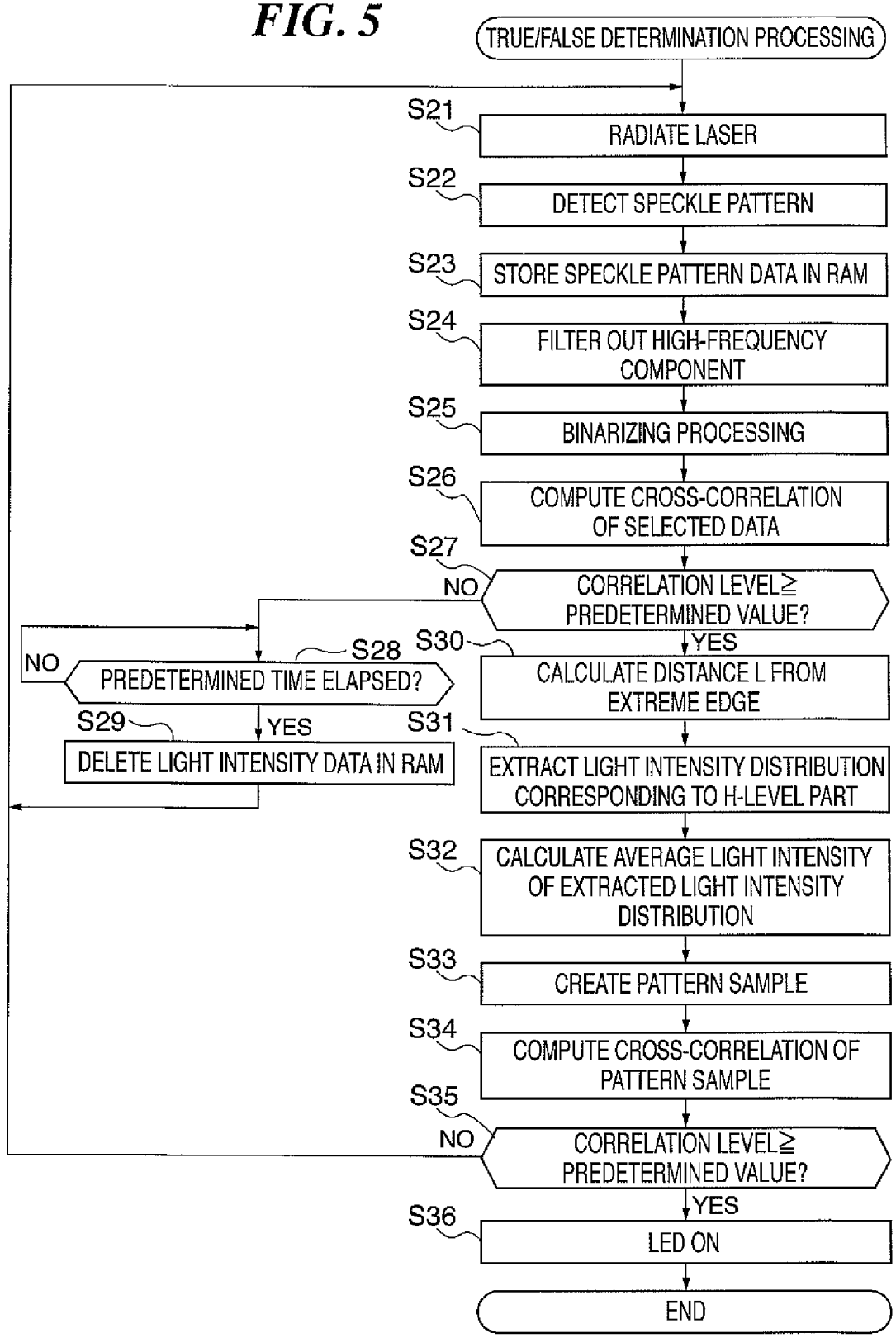
FIG. 5 is a flowchart showing the procedure of true/false determination processing executed by the true/false determining apparatus in FIG. 4.

Next, a true/false determining method executed by the true/false determining apparatus 100 will be described with reference to FIG. 2, FIG. 5 and FIG. 6. FIG. 5 is a flowchart showing the procedure of true/false determination processing executed by the true/false determining apparatus 100 in FIG. 4, and FIG. 6 is a view showing data generated in the true/false determination processing.

In this processing, initial steps S21 to S25 are similar to steps S1 to S5 in FIG. 2. After those steps, first matching processing is performed. The first matching processing roughly determines whether or not the speckle pattern detected in step S21 matches the reference pattern, and aligns a position on the paper P where the speckle pattern is detected.

Figure 6:
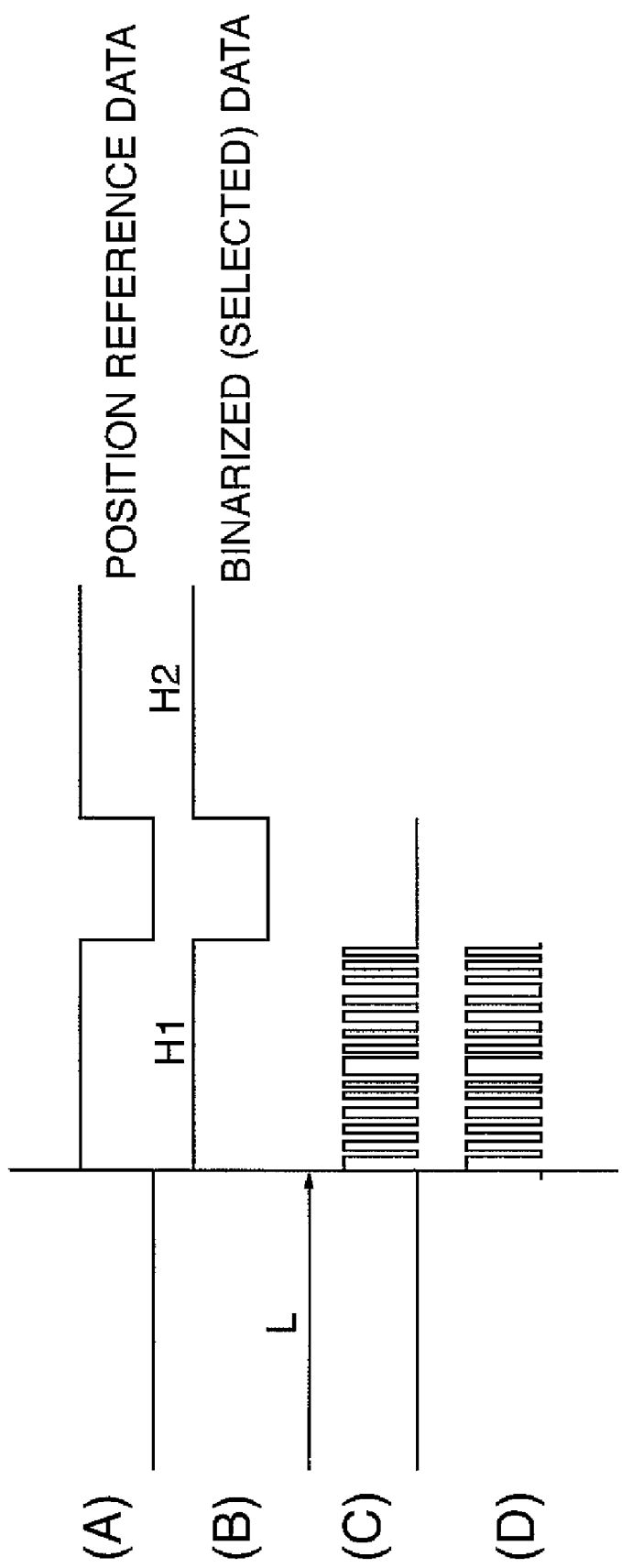
FIG. 6 is a view showing data generated in the true/false determination processing in FIG. 5.
Figure 7:
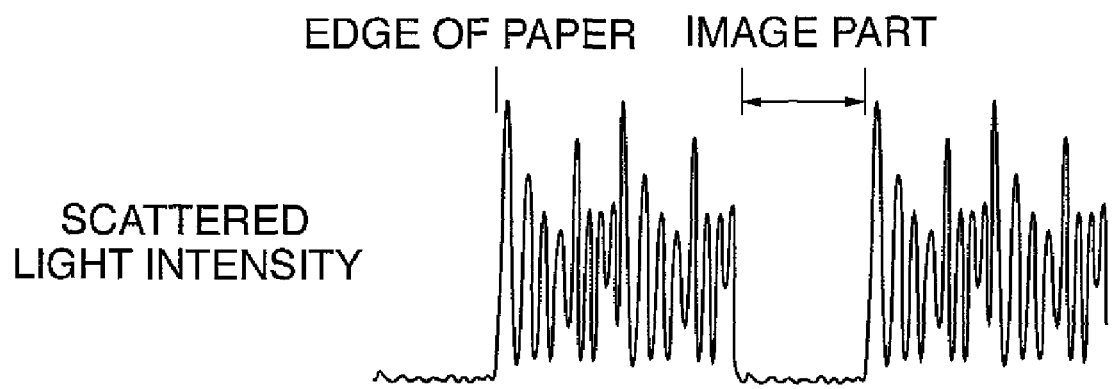
FIG. 7 is a view showing one example of scattered light intensity distribution of laser radiated onto paper in the conventional true/false determining apparatus.
Figure 8:
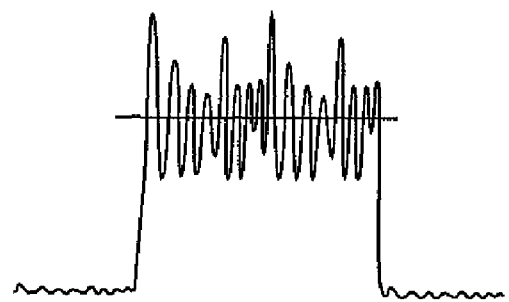
FIG. 8 is a view showing one example of scattered light intensity distribution of laser radiated onto paper in the conventional true/false determining apparatus.

Specifically, first, the first correlation computing unit 104 of the first matching unit 103 performs cross-correlation computing on the position reference data (the data (A) in FIG. 6) prestored in the RAM 20 and the selected data (FIG. 3C, the data (B) in FIG. 6) generated in step S25 to calculate a cross-correlation level between them (step S26). The above position reference pattern data is the selected data for an area corresponding to the reference pattern of the original document created through the execution of the processing in the above steps S21 to S25. The selected data is prestored in the RAM 20 as the position reference pattern data.

Next, it is determined whether the cross-correlation level calculated in step S26 is not less than a predetermined value (step S27). If the cross-correlation level calculated in step S26 is less than the predetermined value, it is determined that the selected data generated in step S25 does not match the position reference pattern, and hence positions in the light intensity distribution (FIG. 3A) corresponding to the selected data does not match positions in the reference pattern. Consequently, after a predetermined time, 500 ms in this embodiment similarly to steps S12 and S13 in FIG. 2, has elapsed since the processing start-up (step S28), the processing deletes the light intensity distribution data stored in the RAM 20 (step S29) and returns to step S21. Otherwise, if the cross-correlation level calculated in step S26 is not less than the predetermined value, it can be expected that the selected data generated in step S25 matches the position reference pattern, and hence the positions in the light intensity distribution (FIG. 3A) corresponding to the selected data matches the positions in the reference pattern. In this case, the offset unit 105 calculates a distance L between an extreme edge and the position on the paper P corresponding to the selected data determined to match the position reference pattern in step S27, and outputs the distance L to the second correlation computing unit 71 in the second matching unit 70 (step S30). Next, it is determined whether or not the light intensity distribution estimated to match the position of the reference pattern matches the reference pattern.

Specifically, similarly to steps S6 to S10 in FIG. 2, the following processing is performed: first, the average intensity computing unit 61 extracts light intensity distribution corresponding to an H-level part, for example an H1 part of the selected data (FIG. 3C, the data (B) in FIG. 6) determined to match the position reference pattern in step S27 from light intensity distribution data (FIG. 3A) stored in the RAM 20 (step S31). Then, average light intensity of the extracted light intensity distribution is computed (step S32). In step S31, light intensity distribution data corresponding to the H1 part of the binarized data (FIG. 3C) is extracted from the light intensity distribution data (FIG. 3A) detected in step S22, as shown in FIG. 3D, and in step S32, average light intensity of the extracted light intensity distribution is calculated. Then, the pattern sample unit 62 sets a threshold for a pattern sample to the average light intensity calculated in step S32 and filters out frequency components of levels above the threshold from the light intensity distribution extracted in step S31 to generate a pattern sample (step S33). In step S33, the pattern sample (the data (C) in FIG. 6) as in FIG. 3E and FIG. 6 is generated.

Next, the second correlation computing unit 71 performs cross-correlation computing processing on a reference pattern (the data (D) in FIG. 6) for the true/false determination prestored in the RAM 20 and the pattern sample generated in step S31 to calculate a cross-correlation level between them (step S34). In step S34, the positions are compensated using the distance L calculated in step S30. For example, the positions in the reference pattern read out and/or the pattern sample are compensated based on the calculated distance L to make the positions of the respective patterns match each other, and then the cross-correlation computing processing is performed. Next, the true/false determining unit 72 determines whether the calculated cross-correlation level is not less than a predetermined value (step S35). If the calculated cross-correlation level is not less than the predetermined value, the pattern sample generated in step S33 matches the reference pattern, i.e. the paper P is determined to be the original document, therefore to be genuine. Accordingly, the LED 82 is turned on (step S36) and the processing ends. Otherwise, if the calculated cross-correlation level is less than the predetermined value, the paper P is determined not to be genuine. Accordingly, the processing returns to step S21 without the LED 82 being turned on.

The predetermined value in the processing in step S27 is set to a value such that the selected data generated in step S25 can be determined to match the position reference pattern. Steps S26 and S27 may be arranged such that, for example, correlation between the patterns is analyzed with respect to 100 pixels from each pattern, and the patterns are determined to be identical with each other if 70 or more of the pixels match.

As described above, the true/false determining apparatus according to the second embodiment of the present invention detects a speckle pattern of an object (the paper P) of the true/false determination, filters out frequency components higher than the predetermined cutoff frequency from the detected speckle pattern, and performs the binarizing processing to create binarized data. Then, the binarized data is matched against the position reference data, and it is determined whether or not the binarized data matches the position reference data. If the binarized data matches the position reference data, it is determined whether or not a pattern sample corresponding to the binarized data matches the reference pattern, that is, the true/false determination is performed. In this way, if the binarized data matches the position reference data, it can be expected that a pattern sample corresponding to the binarized data matches the reference pattern. Since the true/false determination is performed only on the pattern sample, unnecessary execution of the true/false determination can be prevented. Consequently, in addition to the advantage of the true/false determining apparatus according to the first embodiment, time for the pattern matching for the true/false determination can be reduced. Furthermore, the true/false determination on a material can be performed with higher accuracy.

The true/false determining apparatuses according to the above first and second embodiments can be applied to an image forming apparatus such as a printer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-111048 filed Apr. 13, 2006, which is hereby incorporated by reference herein in its entirety.

What is claimed is:

1. A true/false determining apparatus comprising:
a radiating unit configured to radiate coherent light onto a surface of an object on which an image is formed;
a detecting unit configured to detect reflected light of said coherent light as a speckle pattern reflected by said object;
a discriminating unit configured to discriminate, based on an intensity distribution of said reflected light detected by said detecting unit, an image part of the object and a non-image part thereof;
a pattern data generating unit configured to generate pattern data based on the intensity distribution of said reflected light in the non-image part discriminated by said discriminating unit; and
a matching unit configured to determine whether or not the pattern data generated by said pattern data generating unit matches reference pattern data.

2. A true/false determining apparatus according to claim 1, wherein said discriminating unit performs binarizing processing on the intensity distribution of said detected reflected light, and discriminates the non-image part a part based on the intensity distribution of said reflected light on which said binarizing processing has been performed.

3. A true/false determining apparatus according to claim 2, wherein said discriminating unit selects a high-level part of the intensity distribution of said reflected light on which said binarizing processing has been performed as the non-image part.

4. A true/false determining apparatus according to claim 1 comprising a conveying unit configured to convey said object at a regular rate.

5. A true/false determining apparatus comprising:
a radiating unit configured to radiate coherent light onto a surface of an object, on which an image is formed;
a detecting unit configured to detect reflected light of said coherent light as a speckle pattern reflected by said object;
a discriminating unit configured to discriminate based on an intensity distribution of said reflected light detected by said detecting unit, an image part of the object and a non-image part thereof;
a first pattern data generating unit configured to generate first pattern data based on the intensity distribution of said reflected light on the non-image part discriminated by said discriminating unit;
a first matching unit configured to determine whether or not the first pattern data generated by said first pattern data generating unit matches first reference pattern data;
a second pattern data generating unit configured to generate second pattern data based on the intensity distribution of said reflected light on a non-image part discriminated by said discriminating unit depending on a matching result in said first matching unit; and
a second matching unit configured to determine whether or not the second pattern data generated by said second pattern data generating unit matches second reference pattern data;

6. A true/false determining apparatus according to claim 5, wherein said discriminating unit performs binarizing processing on the intensity distribution of said detected reflected light, and discriminates the non-image part based on the intensity distribution of said reflected light on which said binarizing processing has been performed.

7. A true/false determining apparatus according to claim 6, wherein said discriminating unit selects a high-level part of the intensity distribution of said reflected light on which said binarizing processing has been performed as the non-image part.

8. A true/false determining apparatus according to claim 5, wherein said second pattern data generating unit generates said second pattern data if said first pattern data is determined to match said first reference pattern data, as a result of the matching in said first matching unit.

9. A true/false determining apparatus according to claim 5 comprising a conveying unit configured to convey said object at a regular rate.

10. An image forming apparatus comprising the true/false determining apparatus according to claim 1.

11. A true/false determining method comprising:
a radiating step of radiating coherent light onto a surface of an object, on which an image is formed;
a detecting step of detecting reflected light of said coherent light as a speckle pattern reflected by said object;
a discrimination step of discriminating based on an intensity distribution of said reflected light detected in said detecting step, an image part of the object and a non-image part thereof;
a pattern data generating step of generating pattern data based on the intensity distribution of said reflected light in the non-image part discriminated by said discrimination step; and
a matching step of determining whether or not the pattern data generated by said pattern data generating step matches reference pattern data.

12. A true/false determining method according to claim 11, wherein said discrimination step includes performing binarizing processing on the intensity distribution of said detected reflected light, and discriminates the non-image part based on the intensity distribution of said reflected light on which said binarizing processing has been performed.

13. A true/false determining method according to claim 12, wherein said discrimination step includes selecting a high-level part of the intensity distribution of said reflected light on which said binarizing processing has been performed as the non-image part.

14. A true/false determining method according to claim 11 comprising a conveying step of conveying said object at a regular rate.

15. A true/false determining method comprising:
- a radiating step of radiating coherent light onto a surface of an object, on which an image is formed;
- a detecting step of detecting reflected light of said coherent light as a speckle pattern reflected by said object;
- a discrimination step of discriminating based on an intensity distribution of said reflected light detected in said detecting step, an image part of the object and a non-image part thereof;
- a first pattern data generating step of generating pattern data based on the intensity distribution of said reflected light in the non-image part discriminated by said discriminating step;
- a first matching step of matching the first pattern data generated in said first pattern data generating step to first reference pattern data;
- a second pattern data generating step of generating second pattern data based on intensity distribution of said reflected light on the non-image part discriminated by said discrimination step depending on a matching result in said first matching step; and
- a second matching step of determining whether or not the second pattern data generated by said second pattern data generating step matches second reference pattern data;

16. A true/false determining method according to claim 15, wherein said discrimination step includes performing binarizing processing on the intensity distribution of said detected reflected light, and discriminates the non-image part based on the intensity distribution of said reflected light on which said binarizing processing has been performed.

17. A true/false determining method according to claim 16, wherein said discrimination step includes discriminating a high-level part of the intensity distribution of said reflected light on which said binarizing processing has been performed as the non-image part.

18. A true/false determining method according to claim 15, wherein said second pattern data generating step includes generating said second pattern data if said first pattern data is determined to match said first reference pattern data, as a result of the matching in said first matching step.

19. A true/false determining method according to claim 15 comprising a conveying step of conveying said object at a regular rate.

20. An image forming method of executing the true/false determining method according to claim 11.

* * * * *